Dec. 11, 1945.  G. S. STANTON  2,390,622
NAVIGATIONAL AID
Filed Oct. 22, 1942
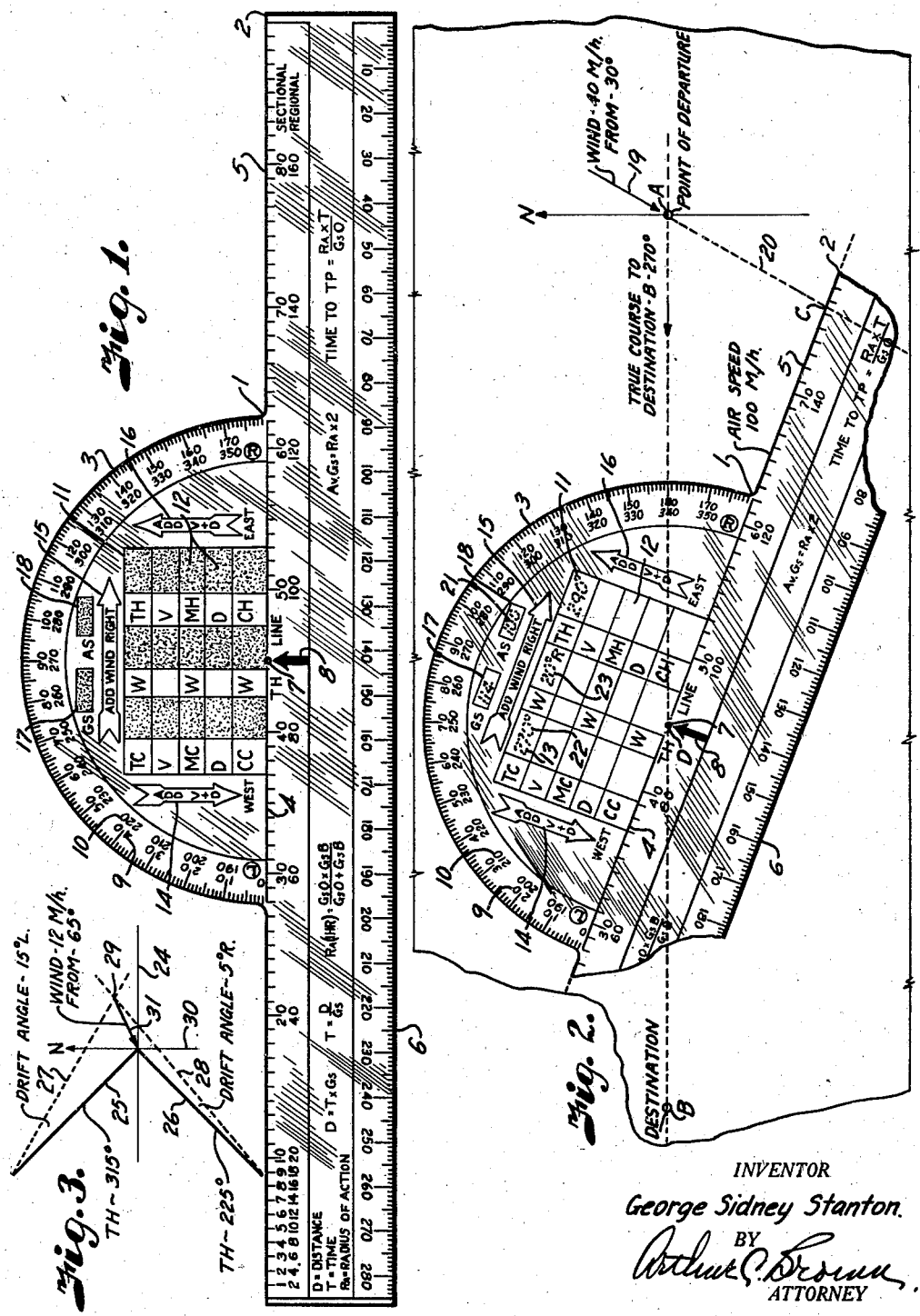
INVENTOR
George Sidney Stanton.
BY
Arthur C. Brown
ATTORNEY Patented Dec. 11, 1945

2,390,622

UNITED STATES PATENT OFFICE 2,390,622

NAVIGATIONAL AID

George Sidney Stanton, Kansas City, Mo.

Application October 22, 1942, Serial No. 462,951

6 Claims. (Cl. 33—75)

This invention relates to navigational aids, and more particularly to an instrument for aiding airmen in solving practical problems in navigation, especially in "dead reckoning" navigation; the principal objects of the present invention being to provide a convenient, economical and efficient navigational aid of the character noted.

Other objects of the invention are to provide a navigational aid in which a calibrated rule and protractor are combined as a single instrument without loss of the functions of such devices used separately; to provide a scale or chart associated with the instrument for aiding in solving navigational problems; and to provide the rule-protractor-chart with indicia having relation to structural portions of the instrument and which are operative in various positions of the instrument.

Other objects of the invention are to so arrange the present navigational aid that it bears a peculiar relationship to available standard navigational charts, thus facilitating solution of navigational problems from a practical standpoint.

In accomplishing these and other objects of the present invention, I have provided improved details of structure, the preferred form of which is illustrated in the accompanying drawing, wherein:

Fig. 1 is a plan view of my improved navigational aid.

Fig. 2 is a fragmentary plan view of my improved navigational aid, particularly illustrating its relation to a practical problem and indicating its manner of use.

Fig. 3 is a diagrammatic representation of a double wind drift problem, indicating the manner in which the present navigational aid facilitates the solution of such problem.

Referring more in detail to the drawing:

1 generally designates a navigational aid embodying the features of the present invention, which preferably includes a rule 2 and a protractor 3 integrally combined, and, further, preferably arranged relative to each other in such a manner that the 0°–180°, 180°–360° diameter 4 of the protractor aligns with one longitudinal edge 5 of the rule 2.

The edge 5 of the rule 2 is preferably calibrated in accordance with the scale of available standard sectional or regional charts, for example of Lambert Conic Conformal type, wherein the scale is eight miles to one inch in sectional charts and sixteen miles to one inch in regional charts. It also has been found preferable to make the rule 2 such a length that, when laid on a parallel of latitude on a sectional chart, it traverses a given number of meridians, a desirable number in the United States being approximately four meridians. Navigational problems may thus be solved on a four meridian basis, as is customary, without the necessity for shifting the instrument longitudinally between an intended point of departure and a point of intended destination.

The opposite longitudinal edge 6 of the rule is preferably calibrated in a suitable scale such as subdivisions of the metric scale and in this instance in tenths of centimeters, in such a manner as to facilitate the solution of problems in a convenient manner on standard size paper that is usually available. In this way each calibration may designate one mile and a convenient designation is thus provided.

Formulae customarily employed in the solution of navigational problems are also preferably provided on the rule, substantially as indicated.

Arranged midway the length of the edge 5 of the rule 2 is an opening 7 to which an arrow 8 points for designating the center of the protractor 3 on the diameter 4 thereof. The diametrical line 4 is also designated as a "TH line" which represents "True heading" as distinguishable from a "True course" or other navigational line. Arranged adjacent the ends of the "True heading" line 4 are indicia "R" and "L," respectively, designating the right and left hand sides of the true heading line relative to the center 7 thereof.

It will be noted that the protractor 3 is so arranged that, starting with the left hand side thereof, the degrees read from zero to 180 in a unitary series 9 of angular degrees and from 180 to 360 degrees in a unitary series 10 thereof, and that adjacent numbers are reciprocals of each other insofar as directional angles are concerned.

It will also be noted that the "R" and "L" designations relate to either series of angles when arranged on either side of a "north-south" line, and that errors in reading angles and calculating their reciprocals are therefore minimized.

Arranged interiorly of the protractor 3 and on the field thereof is a scale, chart, or the like generally designated 11 and showing "Course" and "Heading" designations. "Variations" and "Deviations," together with "Wind correction angle" designations, are also provided. All of the noted designations are preferably provided with spaces 12 adjacent thereto that are preferably provided with a mat surface to provide a writing surface thereon, as indicated in dotted lines at 13, Fig. 2.

Further aids in computing problems on the scale 11 are provided in the "arrows," for example, 14, which indicate that in using the chart 11, "Variation and deviation west" are "added" when progressing downwardly relative to the scale or chart; that "Wind correction angles" are "added" to "Course" designations as indicated by the arrow, for example, 15, when the problem is progressing to the "right" relative to the chart 11, and that "Variation and deviation east" are "added" to the scale or chart 11 designations when progressing upwardly relative to the chart as indicated by the arrow, for example, 16.

"Ground speed" and "Air speed" are important elements in solving navigational problems and such speeds bear a relation to "courses" and "headings," respectively. "Ground speed," therefore, is preferably designated "GS" and arranged adjacent a writing surface 17 in convenient relation to the "True course (TC)" column of the chart 11, whereas "Air speed" is designated "AS" and arranged adjacent a writing surface 18 related to the "True heading (TH)" column 12 of the chart 11.

While the operation of my improved navigational aid may be apparent to airmen and those skilled in the art of navigation, it may be helpful to describe the operation of the instrument in solving typical navigational problems preparatory to flight or encountered in flight. It will be recognized that this problem is worked on a basis of an hour's duration, as is customary with problems of this type.

Fig. 2 illustrates such a problem in which a "True heading" is to be computed toward which an aircraft may be directed in order to travel a proper "True course" from a point of departure "A" to an intended destination "B," the wind direction and velocity being known at a point of departure "A," and, in this instance, being illustratively indicated as forty miles per hour from thirty degrees.

As is known, wind is designated as being "from" a direction, as indicated at 19, and the wind tends to carry the aircraft on a reciprocal of 30 degrees, which is 210 degrees on the protractor, a distance of forty miles per hour, as indicated by the dotted line 20. The air speed of the aircraft is usually known or can be estimated, and in this instance may be designated as "100 miles per hour" and inserted in the space 18 therefor, as indicated at 21, Fig. 2. "Air speed" is related to "True heading," and for the purpose of this problem, 100 miles is measured from the point C, Fig. 2, to the point D on the "True course," the operator using the tenth of a centimeter scale of the rule. The angle between "AD" and "DC" is the "Wind correction angle" and in this instance is 20 degrees.

The problem illustrated in Fig. 2 indicates that the destination "B" is due west of the point of departure "A," in which instance the true course to destination is 270 degrees. The true course may thus be applied to the writing surface in the chart 11 on the protractor, as indicated at 22. The wind correction angle 20 degrees may be applied as indicated at 23, to the writing surface adjacent the uppermost designation "W" for wind.

There thus remains but the problem of computing the "True heading" based on either addition or subtraction of the "Wind correction angle" from the "True course." The indicia "R" and "L" designating right and left wind or the like, and arranged on the protractor relative to the "True heading" line, may now be used to advantage for indicating whether the wind correction angle should be added or subtracted to the "True course" designation. To effect the solution, the hole 7 in the protractor is arranged at the juncture of the "True course" and "True heading" lines, and the "True heading" line of the instrument is placed on the "True heading" line of the problem, as shown in Fig. 2. Such an arrangement results in placing the "R" on the protractor within the wind correction angle to indicate that the wind is "right" and not "left." The designation "R" is then added to the "Wind correction angle" as indicated at 23, and in accordance with the formula 15 to "Add wind right" a "True heading" of 290 degrees is computed.

It is apparent, therefore, that a forty mile wind from 30 degrees requires a "True heading" of 290 degrees in order for an aircraft to travel a "True course" of 270 degrees from the point of departure "A" to its destination "B."

It is believed apparent that "variation" caused by the fact that magnetic "north" does not correspond with true north and by local magnetic disturbances of the earth and "deviation" caused by magnetic disturbances within the aircraft itself, both relative to a magnetic compass in the aircraft, may be compensated for, as indicated on the scale or chart 11, as taught by the formulae.

A further relationship of the indicia and structural elements of the present navigational aid is illustrated in Fig. 3, wherein a double wind drift problem and its solution are illustrated.

As is well known, wind sometimes shifts at different altitudes and at different points along a course and the pilot finds it desirable to determine what changes in the wind occur throughout a trip. As indicated in Fig. 3, therefore, and using the line 24 for a "True course," the pilot turns right 45 degrees on a "True heading" line 25 of 315 degrees for a suitable length of time based upon a problem of an hour's duration, and by means of a suitable drift indicator, observes a drift of 15 degrees to the left. He then turns 90 degrees to the left on a "True heading" line 26 of 225 degrees for a similar length of time, and in a manner similar to the first observation, observes a drift of 5 degrees to the right. An observed drift to the left means that the wind is from the right and in order to compensate for the drift, the "True heading" must be corrected.

To determine the correct compensation for drift, the opening 7 in the protractor on the "True heading" line between the rule and protractor is placed at the outer end of the "True heading" line 25 and with the 90° mark of the protractor coinciding with the "True heading" line 25. As indicated by the designation "L," meaning "left," on the protractor, the observed drift angle is marked in degrees immediately to the "left" of the 90° mark. The observed left drift angle is then drawn to the "left" of the "True heading" line 25 on the line 27. In this instance the proper number is 15 degrees.

The same procedure is performed on the true heading line 26 to result in a line 28 projected at an angle of 5 degrees "right" from the "True heading" line 26. At the intersection 29 of the lines 27 and 28, a line is extended to a "north-south" line 30 passing through the juncture of the "True heading" lines 25 and 26, which line is designated 31 and represents "wind." In this instance, on the scale used, the wind is found to be twelve miles per hour and from 65 degrees.

A change in wind may thus be determined and the "True heading" changed, if necessary, to compensate for the difference in velocity and direction of wind relative to that determined at the point of departure.

It is apparent that the present navigational aid may be made of any suitable material, although it is preferably transparent and of sufficient rigidity to withstand hard and continued usage.

It is apparent, therefore, that the present invention provides a convenient, economical and efficient device for aiding in solving navigational problems, particularly for aircraft.

What I claim and desire to secure by Letters Patent is:

1. In a navigational aid of the character described, a combined rule and protractor, the rule being calibrated on a longitudinal edge thereof in units of eight and sixteen miles per inch, said miles per inch calibrated edge having a designation "TH line" thereon and a hole midway the length of said "TH line," said protractor projecting laterally from said "TH line" uniformly with relation thereto, said protractor having a "right" and "left" indicia on corresponding ends of said "TH line."

2. In a navigational aid of the character described, a combined rule and protractor, the rule being calibrated on a longitudinal edge thereof in units of eight and sixteen miles per inch, said calibrated edge having a designation "TH line" thereon and a hole midway the length of said "TH line," said protractor projecting laterally from said "TH line" uniformly with relation thereto, said protractor having a "right" and "left" indicia on corresponding ends of said "TH line" and having numerals representing angles starting with zero and 180 degrees at the left side thereof and ending with 180 and 360 degrees at the right side thereof, said numerals being arranged as reciprocals of each other.

3. In a navigational aid of the character described, a combined rule and protractor of transparent relatively rigid material, the rule being calibrated along an edge thereof, said edge having a designation "TH line" thereon, said protractor projecting laterally from said "TH line" uniformly with relation thereto, said protractor having a "right" and "left" indicia on corresponding sides of said "TH line" and having a field arranged centrally thereof and having indicia on the field representing a chart, said chart having mat surfaces adjacent said indicia thereof adapted to receive written matter.

4. In a navigational aid of the character described, a combined rule and protractor, the rule being calibrated in centimeters along one longitudinal edge thereof and being calibrated on the opposite longitudinal edge thereof in units of eight and sixteen miles per inch, said miles per inch calibrated edge having a designation "TH line" thereon and a hole midway the length of said "TH line," said protractor projecting laterally from said "TH line" uniformly with relation thereto, said protractor having a "right" and "left" indicia on corresponding ends of said "TH line," said protractor having numerals representing angles starting with zero and 180 degrees at the left side thereof and ending with 180 and 360 degrees at the right side thereof, said numerals being arranged as reciprocals of each other, said protractor having a field arranged centrally thereof and having indicia on the field representing a chart, said chart having writing surfaces adjacent said indicia thereof, and means arranged in the field adjacent the chart for correlating the indicia of said chart.

5. In a navigational aid of the character described, a combined rule and protractor, the rule being calibrated on a longitudinal edge thereof in units of eight and sixteen miles per inch, said miles per inch calibrated edge having a designation "TH line" thereon and a hole midway the length of said "TH line," said protractor projecting laterally from said "TH line" uniformly with relation thereto, said protractor having a "right" and "left" indicia on corresponding ends of said "TH line," a field in said protractor, and a chart in said field having indicia and matched surfaces adjacent indicia of said chart adapted to receive written matter relating to "Course" and "Heading" designations and "Variations" and "Deviations" with "Wind correction angle" designations.

6. In a navigational aid of the character described, a combined rule and protractor, the rule being calibrated on a longitudinal edge thereof in units of eight and sixteen miles per inch, said miles per inch calibrated edge having a designation "TH line" thereon and a hole midway the length of said "TH line," said protractor projecting laterally from said "TH line" uniformly with relation thereto, said protractor having a "right" and "left" indicia on corresponding ends of said "TH line," said protractor having a field arranged centrally thereof and having indicia on the field representing a chart, said chart having writing surfaces adjacent said indicia thereof, and means arranged in the field adjacent the chart for correlating the indicia of said chart.

GEORGE SIDNEY STANTON.